Patented Nov. 27, 1923.

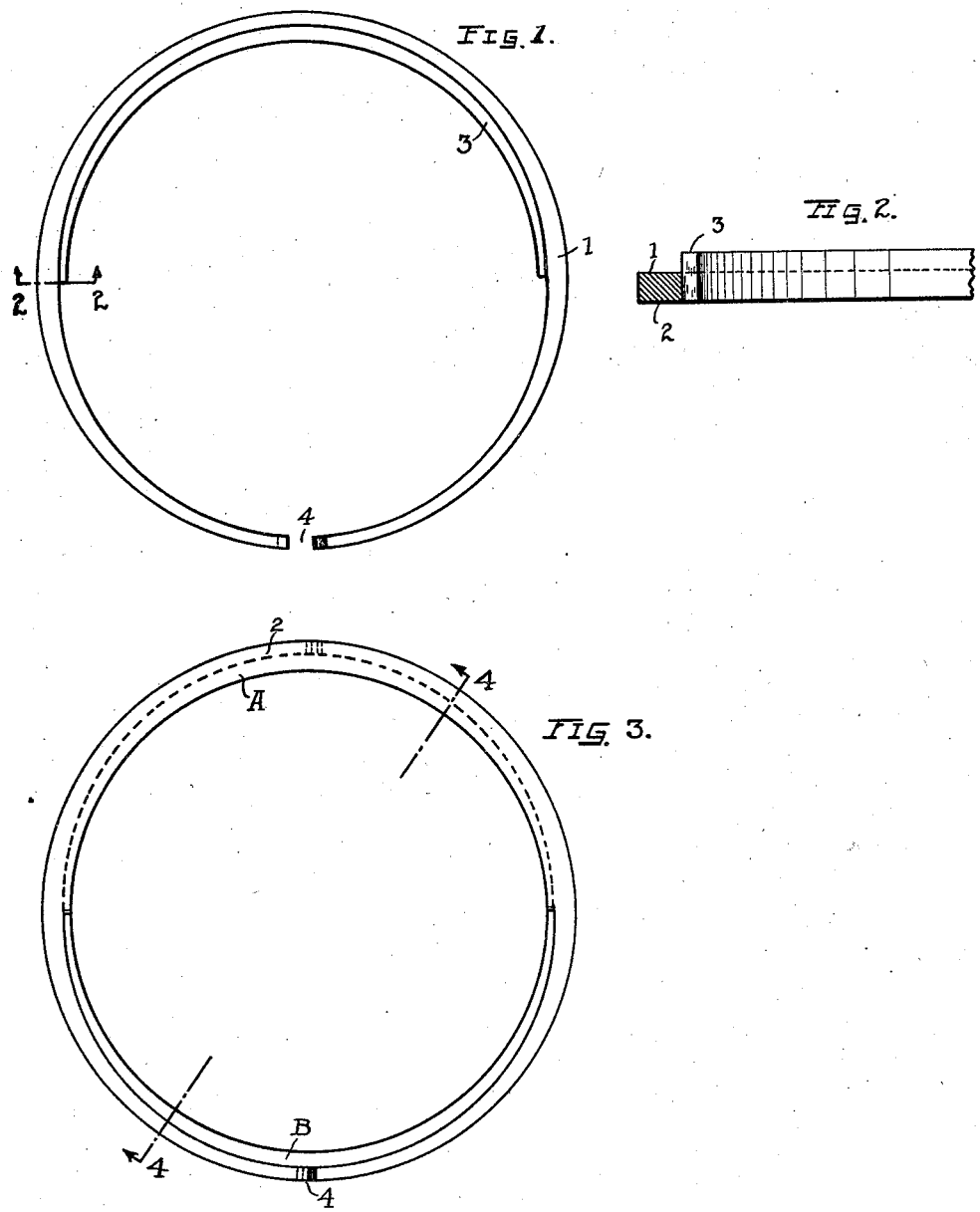

1,475,366

UNITED STATES PATENT OFFICE.

FRANK F. BESSINGER, OF CLEVELAND, OHIO.

PISTON RING.

Application filed May 16, 1921. Serial No. 469,971.

*To all whom it may concern:*

Be it known that I, FRANK F. BESSINGER, a citizen of the United States, residing at Cleveland, in the county of Cuyahoga and State of Ohio, have invented a certain new and useful Improvement in Piston Rings, of which the following is a full, clear, and exact description, reference being had to the accompanying drawings.

The primary object of this invention is to produce a simple and efficient piston ring which may be cheaply manufactured.

A further object of the invention is to produce a pair of piston rings which are duplicates and when fitted together may easily be applied to the ordinary piston to form a packing ring which will prevent loss of compression and leakage of gas and yet will have considerable elasticity to conform to the bore of the cylinder.

A further object of the invention is to increase the strength of the ring shown in my prior Patent Number 1,371,066, granted March 8, 1921.

Another object of the invention is to make the ring of a shape capable of being more cheaply manufactured.

In the accompanying drawings forming a part of this specification,

Figure 1 is a plan view of one of the rings with the eccentric flange up.

Fig. 2 is a section on line 2—2 of Fig. 1.

Fig. 3 is a plan view of a pair of rings assembled as in use.

Fig. 4 is a section on line 4—4 of Fig. 3.

The piston ring consists of two split rings A and B which are of identical construction. Each ring is of substantially uniform thickness and has faces 1 and 2, the face 2 being flat, and the face 1 having an arcuate flange 3 of a height corresponding to the thickness of the ring, so that when the two such rings are fitted together as shown in Figs. 3 and 4 both the upper and lower faces are flat. The inner and outer peripheries of each ring are eccentrically formed so that the radial thickness thereof increases gradually from the split 4 to a diametrically opposite point. The arcuate flange 3 arises from the thicker portion of the ring and its outer face corresponds exactly in curvature with the inner peripheral face of the diametrically opposite portion of the ring and at each point the radial distance from the flange to the outer periphery of the ring is equal to the radial thickness of the diametrically opposite portion of the rings so that when two such rings are fitted together they present a smooth cylindrical outer surface as shown in Figs. 3 and 4. The arcuate flange 3 is thus eccentric and extends nearly half-way around the ring and is of substantial thickness throughout. Since the inside periphery of the flange is of less diameter than the outer periphery thereof and the outer periphery of the flange corresponds in curvature with the inner periphery of the opposite portion of the ring, it follows that there must be inwardly projecting shoulders at the ends of the flange.

To form a complete piston ring, two of these rings are placed in opposing relation and fitted together so that each arcuate flange engages the inner periphery at the split.

The split part of each ring may have any suitable joint such as a butt joint, a bevelled or stepped split joint, or a lapped joint.

Heretofore in making such rings it has been the practice to cast rings of approximately the thickness of the finished body of the ring, plus the depth of the arcuate flanged rib. The various eccentric surfaces are formed by turning about different centers on a lathe. The resulting rings had portions of the internal surface turned about different centers, which resulted in a broken internal surface and necessitated under-cutting and weakening the arcuate flange or rib.

According to the present invention, however, the ring is made more substantial by having the internal cylindrical surface of the arcuate rib coincide with that of the main body of the ring.

The ring may be cast with the arcuate flange projecting from one side and then sized by grinding the outside and the faces of the ring. The other surfaces of the ring, such as the inside surface and the shoulder portion formed by the arcuate flange rising from the face 1 may be finished by a burnishing tool.

What I claim as my invention is:

1. A piston ring packing consisting of a pair of split rings each having an arcuate flange extending partially around the ring and having a substantial thickness throughout its length, the inner side of said flange forming the inner surface of the ring throughout the extent of the flange and forming an inwardly extending shoulder.

2. A piston ring packing consisting of a pair of eccentric split rings each having an arcuate flange extending partially around the ring and having a substantial thickness throughout its length, the inner side of said flange forming the inner surface of the ring throughout the extent of the flange and forming an inwardly extending shoulder.

3. A piston ring packing consisting of a pair of split rings of substantially identical construction, each having an arcuate flange extending partially around the ring and having a substantial thickness throughout its length, the inner side of said flange forming the inner surface of the ring throughout the extent of the flange and forming an inwardly extending shoulder.

4. A two part piston ring comprising a pair of interfitting rings, each ring having a segmental flange extending from one side thereof, the inner surface of said rings conforming to the inner surface of the segmental flange and the remainder of the inner surface conforming to the outer surface of the segmental flange on the other ring, said flanges being of substantial thickness throughout and the inner surface of the rings having a shouldered portion at the ends of the segmental flange.

5. A two part piston ring comprising a pair of interfitting rings, each ring having a segmental flange projecting from one side thereof of substantial thickness throughout its length, the inner and outer surfaces of said flange having different centers of curvature, the inner surface of each ring conforming to the inner surface of the segmental flange throughout the extent thereof, and the remainder of the ring conforming to the curvature of the outer surface of said segmental flange, whereby said rings interfit to form a piston ring.

In testimony whereof I hereunto affix my signature.

FRANK F. BESSINGER.